United States Patent [19]

Mannheim

[11] 4,173,672
[45] Nov. 6, 1979

[54] DECORATED SAFETY GLASS

[76] Inventor: Jose R. Mannheim, Avda. La Pradera 164, Lima, Peru

[21] Appl. No.: 830,879

[22] Filed: Sep. 6, 1977

[51] Int. Cl.² ........................... B32B 3/10; B44C 1/18
[52] U.S. Cl. ..................................... 428/203; 156/99; 156/100; 156/106; 156/235; 156/240; 156/277; 8/2.5 A; 428/201; 428/210; 428/437; 428/914
[58] Field of Search .............. 428/210, 437, 914, 201, 428/203; 156/240, 100, 277, 99, 235, 106; 8/2.5 A, 2.5 R, 4

[56] References Cited

U.S. PATENT DOCUMENTS

| | | | |
|---|---|---|---|
| 3,537,944 | 11/1970 | Grubb | 428/437 |
| 3,860,388 | 1/1975 | Haigh | 428/914 |
| 3,868,286 | 2/1975 | Fariss | 156/100 |
| 3,922,445 | 11/1975 | Mizuno | 428/914 |
| 3,922,546 | 11/1975 | Baldridge | 156/277 |
| 3,952,131 | 4/1976 | Sideman | 428/914 |
| 4,059,471 | 11/1977 | Haigh | 428/914 |

FOREIGN PATENT DOCUMENTS

| | | | |
|---|---|---|---|
| 50-38152 | 12/1975 | Japan | 428/203 |
| 717387 | 10/1954 | United Kingdom | 428/437 |

*Primary Examiner*—Ellis P. Robinson
*Attorney, Agent, or Firm*—Holman & Stern

[57] ABSTRACT

A method to decorated laminate glass comprised of two glass sheets joined by a decorated film of a thermoplastic polymer. A sheet of glass, the film and a lamina of cellulosic material, decorated on the surface that contacts the film, are subjected to pressure and heat so as to transfer, by sublimation, said decoration to the film at the moment that it adheres itself to the surface of the glass. A second sheet of glass is over-placed on the decorated film and pressed to it, with heat, so as to form a safety glass decorated and/or colored in the interior.

14 Claims, 1 Drawing Figure

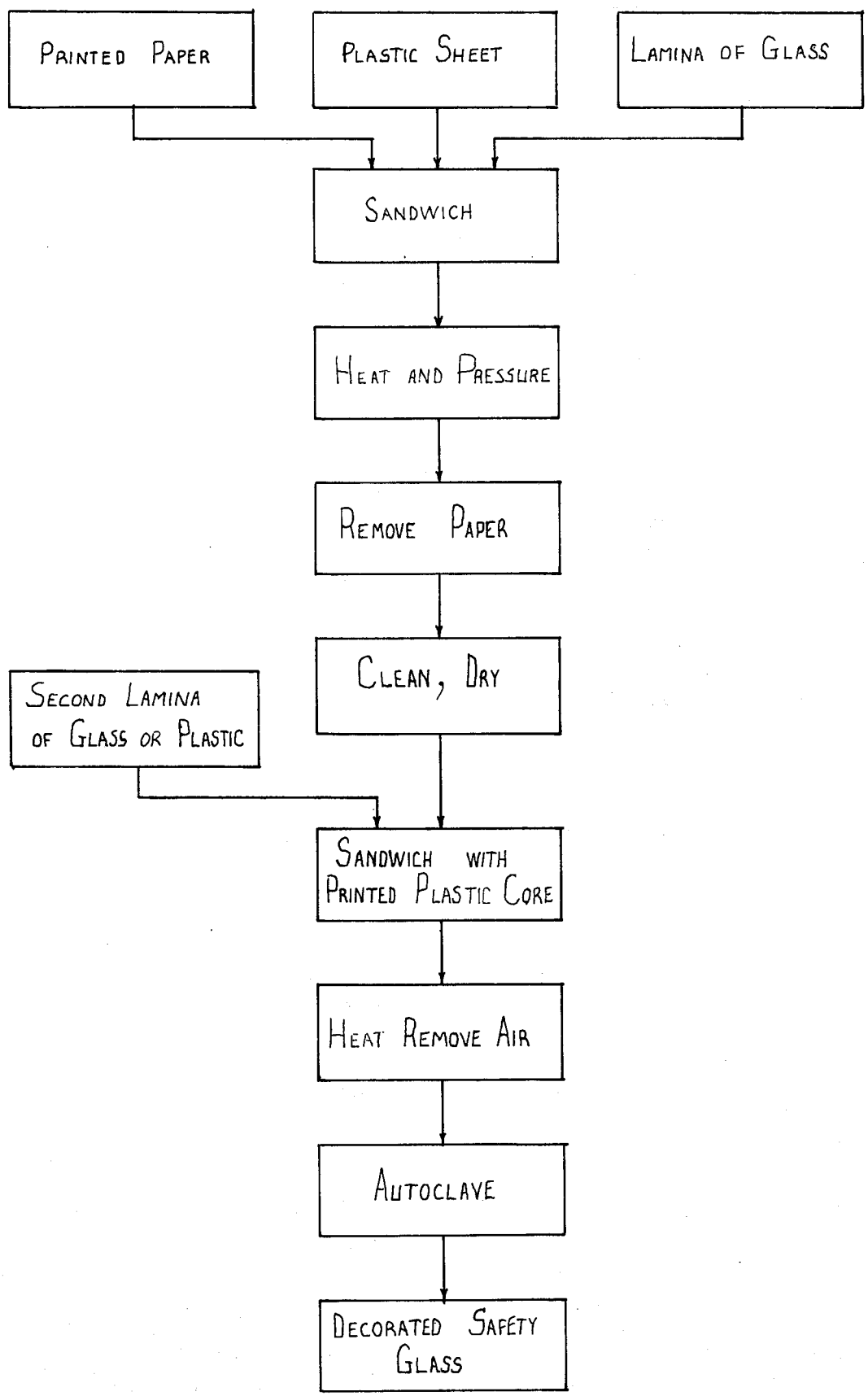

DECORATED SAFETY GLASS

The present invention relates to laminates, and more particularly to a new method to obtain a decorated safety glass by thermo-impression and fixation of a polyvinyl butyral sheet between two glass sheets, and the obtained product.

BACKGROUND OF THE INVENTION

The safety glass is obtained by interposing a thermoplastic film, preferably of polyvinyl butyral, between two glass sheets and by applying afterwards a lamination process film. The core of this safety glass has never before been colored or decorated because the polyvinyl butyral film, due to its tackiness and stickness, cannot be subjected to an impression process. Thus, the film has always been transparent or translucent so as to give the safety glass its own characteristic, consequently said glass has never been decorated and/or colored before.

Some attempts has been made to color or decorate this type of laminated glass by using a silk screening or photographic process directly to the interior surface of one of the glass plates or on the polyvinyl butyral film. When the decoration is applied to the interior surface of one of the glass sheets, the finished laminated glass becomes translucent due to the fact that the colouring material does not permeate the thickness of the plastic film but it only forms a layer between the film and the sheet of glass surface. Serious difficulties have been found when attempts has been made to decorate the film of polyvinyl butyral. In fact it is very difficult to work on this film because of its adhesive consistency due to the temperature of the enviroment and also because of its great plasticity which makes the process a very expensive and inefficient one due to the fact that said material will not resist scratching of ink deposited thereon by silk-screening process. This is the reason why such techniques for providing decorated polyvinyl butyral adhesive lamina are unsuccessful for all practical purposes.

SUMMARY OF THE INVENTION

I have discovered now that a film of plastic material, preferably of polyvinyl butyral, can be easily coloured and/or decorated by a thermo-impression process at the instant that it is laminated by pressure against a glass sheet, and if this glass sheet, with one of its faces adhered to said decorated film, is covered by another undecorated glass sheet, or the like, it will become a sandwich which will be laminated by heat and pressure so as to form a decorated safety glass. In this way the laminated product will be formed by a safety glass and at the same time have an interior decorated or colored, transparent and/or translucent glass.

The ultimate laminated products, formed in accordance with this invention, will find utility in the automobile industry and in the transportation industry in general, in the building industry and in interior decorating, in the furniture industry, in various form of illumination, in making aquariums, mirrors, shower doors, and in any situation where such decorated glass might be needed.

When the term colored and/or decorated glass is used herein, the following meet this definition: one-color or various color impressions, of completely one or various shades, transparent or translucent glass totally or partially decorated and/or colored, glass colored and/or decorated over reflecting surface according to traditional process or by using one or both glass sheets with totally or partially reflecting surfaces, or as blindage glass, curved glass, and in general all kind of decorated and artistic combinations that can be made on laminated glass.

Briefly, the invention consists of: transferring a colored impression from a temporary cellulosic support sheet to a polyvinyl butyral adhesive plastic film spread on a lamina of glass, this transference being made by heat and pressure; removing the temporary cellulosic support when the colored impression has been transferred from the cellulosic layer to the polyvinyl butyral; placing a second lamina of glass over the polyvinyl decorated film in direct contact with it; and subjecting these two glass sheets and said interposed decorated film to heat and pressure until the colouring material gets impregnated into the polyvinyl butyral semi-fluid film so as to make this film transparent as shown in the accompaning FIGURE.

According to this invention, the color impression permeates the thickness of the plastic film. Preferably, the color impression is imparted to the plastic film by evaporating or subliming the color impression contained in the sheet of cellulosic material into the plastic film. Preferably, sublimation or evaporation of the color impression from the printed paper is effected by depositing the plastic film on the lamina of glass and placing thereover the printed paper. The temporary cellulosic support prevents the adhesion of the plastic film to the heat press or heated rollers when the three-layered composite is subjected to heat and pressure which causes the sublimation of colors on the paper sheet into the plastic film.

The polyvinyl butyral film is formed of polyvinyl butyral resin with a plasticizer as Flexol 3GH (Triethylene glycol di-2-ethylbutyrate). The plastic film may be from 0.005 to 0.080 inches thick. The thermo-impression process of this invention may be undertaken on films 0.015, 0.020 and 0.045 inches thick, as well.

After the thermo-impression process is completed, the cellulosic support is stripped from the plastic film, bearing the color impression, and said plastic film must be cleaned usually by washing and dried to a humidity content of 0.1% to 2.5% together with the lamina of glass to which it is adhered. A second lamina of glass or similar is placed over the decorated film so as to compose a sandwich, formed of two sheets of glass and an inner film of the printed plastic, which is subjected to a temperature from 80° to 200° C. to remove the air from the interior of the sandwich, and afterwards the assembly is subjected to heat and pressure in an autoclave to render it as transparent as possible.

An object of the present invention is to obtain a laminated glass internally decorated and/or coloured by thermo-impression.

Another object of the invention is to supply coloured and/or decorated safety glass, transparent and/or translucent glass for decorating purposes.

Another object of the present invention is to obtain a simple and economic method for the thermo-impression on a polyvinyl butyral film placed on a rigid support for decorating purposes.

These and other objects of the invention will become apparent from the following description relating to one embodiment of the invention, given by way of example only, since certain changes can be made in carrying out the above process and in the laminates products without departing from the scope of the invention.

For better understanding of the nature of this invention, reference should be had to the following description of the preferred embodiment with reference to the flow sheet in the drawing.

Firstly, the plastic film, preferably a film of polyvinyl butyral resin, is cleaned. Usually, rolls of polyvinyl butyral in bulk form are treated, when produced as a film, with powder and/or polyethylene to prevent the polyvinyl butyral film from sticking or adhering to itself due to his inherent unmanageability and tackiness. This powder and/or polyethylene must be removed prior to the employing of polyvinyl butyral film in the thermo-impression process of the invention.

Thereafter, a sandwich is formed wherein the polyvinyl butyral film is the center element of a three-lamina composite, one of which is an outer lamina of glass and another outer lamina which will be a printed paper bearing a color impression formed of organic or inorganic colorants. These colorants are characterized as possessing a greater affinity for the plastic film which will receive them than the affinity which these colorants have for the cellulosic material which initially supports them. The color impression of the printed paper may be one single color or may contain a variety of designs. The cellulosic support acts not only to protect the plastic from distortion due to adhesion to the machine employed to effect the thermo-impression process of this invention, but also to support the plastic polyvinyl butyral film which becomes semi-fluid on heating.

Preferably, the color bearing transfer paper is paper of high satin finish. This is not a critical requirement in that newspaper may be employed in the thermo-impression process, but for the difficulties encountered in removing such paper from the polyvinyl butyral sheet. As stated above, inorganic and organic colorants or dyes may be employed to form designs of the transfer paper. Preferably, such dyes or colorants are dispersed in water for application to a paper sheet. Thickeners such as dextrin and carob gums may be included in the dyes containing solutions. The paper may be impregnated or merely coated with such solutions. The colorants or dyes may be incorporated into the paper mix prior to casting the mix into rolls of paper. The organic dyes which may be employed are preferably dispersed dyes or plastosoluble dyes.

The composite laminate is transported to a heating machine in which is subjected to simultaneous high temperatures and pressures. Temperatures employed may range between 60° to 220° C., however, temperatures around 150° C. are preferred. The increased pressure employed may range from 100 gr/cm$^2$ to 2,000 gr/cm$^2$ preferably, however, pressures ranging between 150 to 200 gr/cm$^2$ are employed. Preferably, the composite laminate is protected by a rigid lamina of glass, metal or appropiate material that covers the surface of the printed paper during its passing through the heating machine. When this protective cover is a glass lamina it is later used to form the corresponding decorated safety glass.

The time required for said transference of color-impression depends on the degree of heat and of the applied pressure but it should be enough for the polyvinyl butyral to become semi-fluid and the colorants, sublimed or evaporated, to permeate the thickness of the polyvinyl butyral film.

After the thermo-impression process is completed, the polyvinyl butyral plastic film fixed to the lamina of glass must be cleaned, stripping the paper which bore the color impression and removing all contaminants. This is carry out by washing it with water or with adequate chemical solution. After efficiently cleaning the film, the lamina of glass with the decorated film adhered to it should be dryed in order to obtain a humidity content, in the plastic film, of 0.1 to 2.5% preferably a humidity content of 0.3%, and then the film will remain as an adhesive element on the laminating glass.

While the following description is particularly directed to employing the decorated laminated glass sheets, it is to be understood that the lamina of glass with the decorated film adhered, may be employed with an outer layer of plastic lamina adhering to the film surface.

According to the invention, the decorated film thermically fixed to the lamina of glass is covered by a second lamina of glass or similar, preferably the lamina of glass used to protect the printed paper in the first step of the process, forming in this way two sheets of glass with an intermediate printed polyvinyl butyral plastic film. Superior decorated laminated safety glass products are obtained when the thermo-impression printed polyvinyl butyral plastic sheet is covered with a second polyvinyl butyral film before the second lamina of glass is over-placed. Thus, in another preferred embodiment, the resulting glass laminate is produced by laminating two glass sheets with an adhesive element interposed, said element comprising one printed polyvinyl butyral sheet and a second polyvinyl butyral sheet over-placed, or particularly, two polyvinyl butyral sheets.

The assembly of two sheets of glass and an intermediate plastic element, preferable the two layers of polyvinyl butyral described above, are placed in an oven at temperatures ranging from 60° to 500° C., but preferably at approximately 350° C. Air is eliminated from the glass laminate assembly. Thereafter, the assembly is finally heated in an autoclave to make it as transparent as possible. The preferred physical conditions include temperatures ranging from 70° C. to 550° C., preferably in the range of 135° to 150° C.; pressure ranging from 25 psi to 850 psi, preferably 100 psi, and a time cycle of 30 minutes to 24 hours, preferably 3 hours. The products which result are substantially transparent during autoclave conditions. Then the laminated glass should be inspected and checked for technical especifications in light of their intended use.

In addition to the product described in the preferred embodiment of this invention, it is within the scope of this invention that more than two layers of glass may be laminated according to the above described process. In addition, it is within the scope of this invention that the decorated glass formed according to the process of this invention be employed to form thermal-glass. The terminology "Thermal-Glass" is meant to imply a structure formed of two independent sheets of glass welded at the edges with a vacuum between the two glass sheets. Moreover, cathedral glass, glass with one even surface and one uneven or irregular surface, may be employed with the printed polyvinyl butyral film of this invention to form translucent glass.

In addition, modifications known in the prior art may be employed in conjunction with this invention. Particularly, when a printed film produced according to the thermo-impression process of this invention is employed to form decorated glass, a reflective glass may be produced by including an appropiate metal-coated glass.

Having thus described the invention, I claim:

1. A method of manufacturing decorated colored glass comprising the following steps:
    (a) transferring, with heat and pressure, a color impression from a printed cellulosic support into an adhesive plastic polyvinyl butyral film spread on a lamina of glass for a time period sufficient for the film to become semi-fluid and for the colorants to permeate the entire thickness thereof;
    (b) removing the cellulosic support when the color impression has been transferred from the cellulosic layer into the polyvinyl butyral film and when said film has been permanently adhered to said lamina of glass;
    (c) placing a second lamina over the decorated polyvinyl butyral film, in direct contact with it; and
    (d) laminating these two lamina and said interposed decorated film at a pressure ranging from 25 psi to 850 psi and at a temperature ranging from 70° C. to 350° C.

2. The method of claim 1 wherein the plastic film bearing the color-impression remains strongly adhered to the sheet of glass when the cellulosic support is removed from the three-layer composite.

3. The method of claim 1 wherein the plastic film, bearing the color impression, is covered with another film of polyvinyl butyral before said second lamina is over-placed on said decorated film.

4. The method of claim 1, further including between steps (b) and (c), the steps of cleaning the affixed film, and drying the same to a humidity content of from 0.1 to 2.5%.

5. The method of claim 1 wherein the plastic sheet, bearing the color impression, is covered with a second and permanent lamina to form a composite of three elements comprising two outer sheets and a core adhesive element of decorative polyvinyl butyral, this composite being subjected to a lamination at temperatures in the range of 60° to 220° C. to eliminate the air.

6. The method of claim 5 wherein the plastic sheet bearing the color impression is covered with a permanent lamina of transparent synthetic material.

7. The method of claim 5, wherein the laminate composite is autoclaved at a temperature ranging from 75° C. to 150° C. and pressure of 100 psi.

8. The method of claim 7, wherein step (d) is carried out for a time period of from 30 minutes to 24 hours.

9. The method of claim 1 wherein said printed cellulose support, said adhesive film and said sheet of glass forming a sandwich, at the center of which is the polyvinyl butyral film, is subjected to temperatures between 60° to 220° C. and pressure between 100 to 1,000 gr/cm² in the thermo-impression process.

10. The method of claim 9 wherein the printed cellulosic support is covered with a temporary rigid sheet, of metal or glass, during the thermo-impression process.

11. The method of claim 9 wherein the film and lamina of glass are dried to a humidity content of 0.3%.

12. The product of the method of claim 1, wherein said product is transparent.

13. The product of the method of claim 1 wherein said product is translucent.

14. The product of the method of claim 1 wherein said product is opaque.